United States Patent
Brendel

(10) Patent No.: US 7,812,962 B2
(45) Date of Patent: Oct. 12, 2010

(54) POLARIZATION MODE DISPERSION MEASUREMENT USING AN IMPROVED FIXED ANALYZER METHOD

(75) Inventor: Jurgen Brendel, Nyon (CH)

(73) Assignee: Luciol Instruments SA, Mies (CH)

( * ) Notice: Subject to any disclaimer, the term of this patent is extended or adjusted under 35 U.S.C. 154(b) by 75 days.

(21) Appl. No.: 12/110,734

(22) Filed: Apr. 28, 2008

(65) Prior Publication Data

US 2009/0268198 A1 Oct. 29, 2009

Related U.S. Application Data

(60) Provisional application No. 60/916,869, filed on May 9, 2007.

(51) Int. Cl.
- *G01B 9/02* (2006.01)
- *G01B 11/02* (2006.01)
- *G01J 3/45* (2006.01)
- *G01N 21/00* (2006.01)

(52) U.S. Cl. ............ 356/480; 356/73.1; 356/454; 356/492; 356/519

(58) Field of Classification Search ............ 356/73.1, 356/454, 480, 519, 492
See application file for complete search history.

(56) References Cited

U.S. PATENT DOCUMENTS 4,536,088 A * 8/1985 Rashleigh et al. ........... 356/480
6,750,956 B2 * 6/2004 Moeller ...................... 356/73.1
2002/0093643 A1 7/2002 Moeller
2003/0067602 A1 4/2003 Patel et al.
2003/0118263 A1 6/2003 Phua et al.

FOREIGN PATENT DOCUMENTS

| EP | 1 394 524 | 6/2003 |
|---|---|---|
| EP | 1 376 907 | 1/2004 |
| WO | WO 2004/070341 | 8/2004 |
| WO | WO 2005/060130 | 6/2005 |
| WO | WO 2007/082054 | 7/2007 |

OTHER PUBLICATIONS

Hsu et al., Fiber Fabry-Perot interferometers with very low polarization sensitivity, Applied Optics, Oct. 1, 1994, vol. 33, No. 28, USA.

* cited by examiner

*Primary Examiner*—Patrick J Connolly
(74) *Attorney, Agent, or Firm*—Moetteli & Associes Sarl

(57) ABSTRACT

A device for performing polarization mode dispersion (PMD) measurements of an optical fiber is disclosed. The PMD measurement device employs a fixed analyzer method, and includes a tunable Fabry-Perot inferometer as the wavelength-selective element and an optical bandpass filter for spectrum calibration. A novel scanning algorithm, which performs multiple scans at different velocities, enables accurate PMD measurements, even of moving optical cable. The tunable Fabry-Perot interferometer is able to scan over a wide wavelength range and yet have a narrow linewidth, such that a wide range of PMD values can be measured.

9 Claims, 7 Drawing Sheets

POLARIZATION MODE DISPERSION MEASUREMENT USING AN IMPROVED FIXED ANALYZER METHOD

The present application claims priority to previously filed U.S. Patent Application Ser. No. 60/916,869, filed May 9, 2007.

FIELD OF THE INVENTION

The present invention is in the field optics: measuring and testing (Class 356). Specifically, the present invention relates to methods and apparatus for determining the optical properties of articles by measurement of the effect produced by the articles on the polarized light. More specifically, the present invention relates to inspection and testing of transparent elongated structures (e.g., optical fibers) which are used to transmit light rays from one point to another within the confines of their outer surface, and involving internal reflections or modal transmission (Subclass 73.1).

BACKGROUND OF THE INVENTION

Polarization mode dispersion (PMD) is a dispersion factor in optical fibers that can limit the bandwidth, or data rate, of fiber optics networks. As data transmission rates in optical fibers are exceeding ten gigabits/second (Gb/s) and fast approaching forty Gb/s and more, the PMD of the optical fiber indicates whether such transmission rates will be successful.

PMD is caused by the birefringence of the optical fiber. Birefringence is a property of the fiber in which the incoming light is split into two orthogonal propagation modes. Where each of these modes travels along the optical fiber at the same velocity, the transmitted data may be detected at the receiver without error. Sometimes, however, due to imperfections in the optical fiber (such as the fiber having an elliptical core rather than a circular one) the two modes may travel through the fiber at a different velocity, known as differential group delay dispersion (DGD). The DGD causes a broadening of the optical pulses at the other end of the fiber, such that a receiver is unable to reliably read the transmitted data.

To achieve a high transmission rate of an optical communications system, the data is transmitted with optical pulses that are shorter, relative to lower-rate transmission systems. The PMD characteristic of the optical fiber indicates whether such high-rate transmission will be successful. Thus, PMD testing is performed as part of a standard optical fiber installation or upgrade.

There exist several methods for performing PMD analysis: fixed analyzer, interferometry, and stokes parameter evaluation, to name a few. Most instruments for testing PMD in the field are either based on the interferometric method or the fixed analyzer method. While the data obtained by the interferometric method is in the time domain, the fixed analyzer method obtains data in the frequency domain. Both are standard methods recommended by ITU (International Telecommunication Union) and ANSI (American National Standards Institute), and the measurement results are equivalent using each method.

The fixed analyzer method (also called the wavelength scanning method) takes a measurement comparable to that obtained by an optical spectrum analyzer. A broadband polarized light source is launched at one end of the optical fiber and the spectrum representative of the light leaving the fiber at the other end is analyzed. Since the PMD of an optical fiber is proportional to the number of extrema found in the spectrum of the transmitted light signal, the PMD is obtained by counting the extrema of the spectrum representing the received light.

A simplified block diagram of a fixed analyzer method 50A is depicted in FIG. 1A, according to the prior art. An emitter 20 includes a broadband polarized light source 22, which sends light 24A into an optical fiber, or fiber under test (FUT) 30. At the other end of the FUT 30, the transmitted light 44A is detected by a receiver 40, which includes a fixed polarizer 42 and a scanning filter 48. The fixed polarizer 42 selects one linear polarization state 46 of the transmitted light 44A. The polarized light 46 is sent into the scanning filter 48, or tunable optical bandpass filter, which filters out all but a portion of the light 46, at a desired central wavelength. This operation is repeated while scanning the central wavelength over a predefined range. The extrema of this spectrum at each wavelength are counted to calculate the PMD of the optical fiber.

Another example of a fixed analyzer method 50B is depicted in FIG. 1B, according to the prior art. Instead of filtering the outgoing signal 44B from the optical fiber 30, the emitter 20 includes a polarized tunable light source 26, enabling the desired wavelength to be selected prior to transmission. Again, the extrema of the spectrum are counted at the receiver. The fixed analyzer methods 50A and 50B represent two of many possible implementations for performing PMD analysis.

The measured PMD value is proportional to the number of extrema found in the spectrogram. Referring to the example of FIG. 1A, the minimum measurable PMD value is given by the spectral width of the light source 22 and the wavelength tuning range of the filter 48. The maximum value is given by the linewidth of the tunable filter 48. Consequently, to obtain a wide PMD measurement range, the tunable filter 48 needs to have a wide tuning range and a narrow linewidth.

To obtain an accurate measurement using extrema counting, the FUT 30 needs to be stable (e.g., not moving). Controlling movement of the FUT is not always possible, however, such as when testing aerial cables during bad weather conditions. If the fiber is moving during the measurement, the output state of polarization can change, which leads to additional extrema in the recorded spectrum and a wrong PMD value. However, accurate measurements of moving optical fibers may be obtained when using a very fast tunable filter.

In the fixed analyzer method 50A (FIG. 1A), the scanning filter 48 in the receiver 40 is a tunable optical bandpass filter, used to make the wavelength scan. The filter 48 is typically set to start at the first desired wavelength. In a second step, the wavelength setting is increased to a next wavelength. The process is repeated until the end wavelength of the scan is selected. The optical bandpass filters are typically based on thin-film filters or diffraction gratings. Both types of filters need to be mechanically tuned by a motor, which limits the maximum achievable tuning speed. Such filters are not fast enough to obtain PMD measurements of fast-moving optical cables.

Thus, there is a continuing need for a fixed analyzer method for PMD testing that overcomes the shortcomings of the prior art, namely, a fixed analyzer having the ability to provide accurate PMD measurements of moving cables.

SUMMARY OF THE INVENTION

The present invention is a device for performing polarization mode dispersion (PMD) measurements of an optical fiber. The present PMD measurement device uses a fixed analyzer method in a novel manner. The wavelength-selective element is a Fabry-Perot inferometer which is capable of performing very fast tunable wavelength filtering of light emerging from the optical fiber. An additional fixed optical bandpass filter blocks unwanted interference orders generated by the interferometer. At the same time, the broadband filter defines the spectral tuning range and is used as a wavelength reference for calibrating the spectrum. A scanning algorithm directs the interferometer to perform multiple scans at different velocities, enables fast scans, for accurate PMD measurement of moving optical cable. The PMD measurement device is able to scan over a wide wavelength range and yet has a narrow linewidth.

DETAILED DESCRIPTION

Figure 1A:
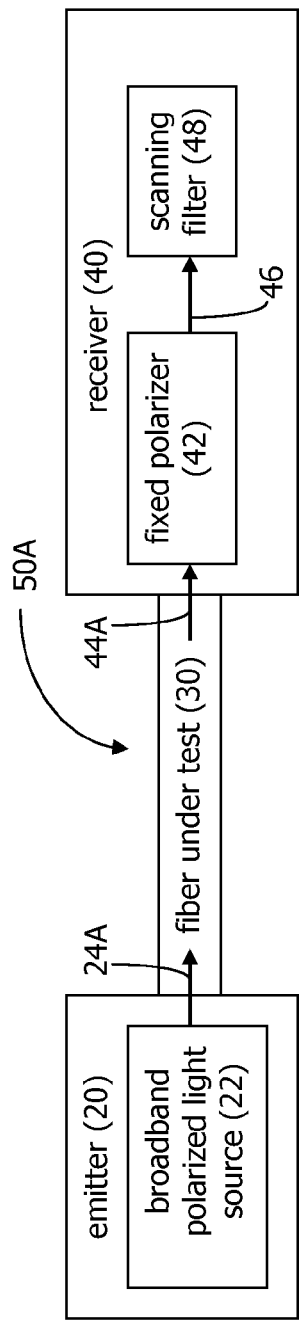
FIGS. 1A and 1B are simplified block diagrams of fixed analyzer methods for measuring PMD of optical fibers, according to the prior art.
Figure 1B:
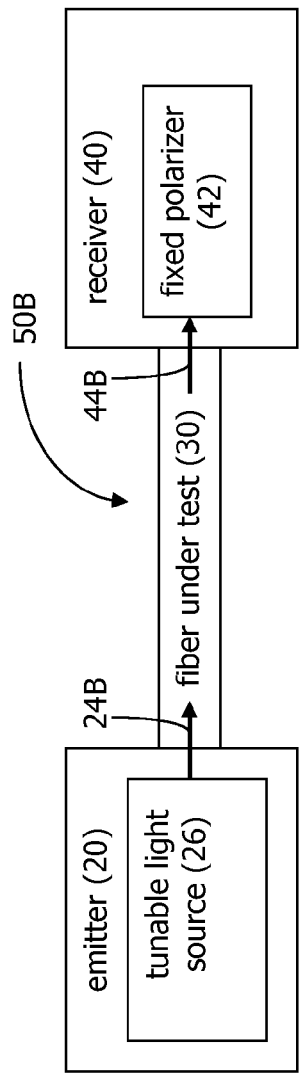

According to the embodiments described herein, a device for performing polarization mode dispersion (PMD) measurements of an optical fiber is disclosed. The PMD measurement device, which employs a fixed analyzer method, includes a Fabry-Perot inferometer as the wavelength-selective element, as well as an optical bandpass filter. See FIGS. 1A and 1B. The device uses a novel scanning algorithm, which performs multiple scans at different velocities. The PMD measurement device is advantageous in that it is capable of testing moving optical cable and is capable of obtaining a wide range of measurable PMD values.

Figure 2:
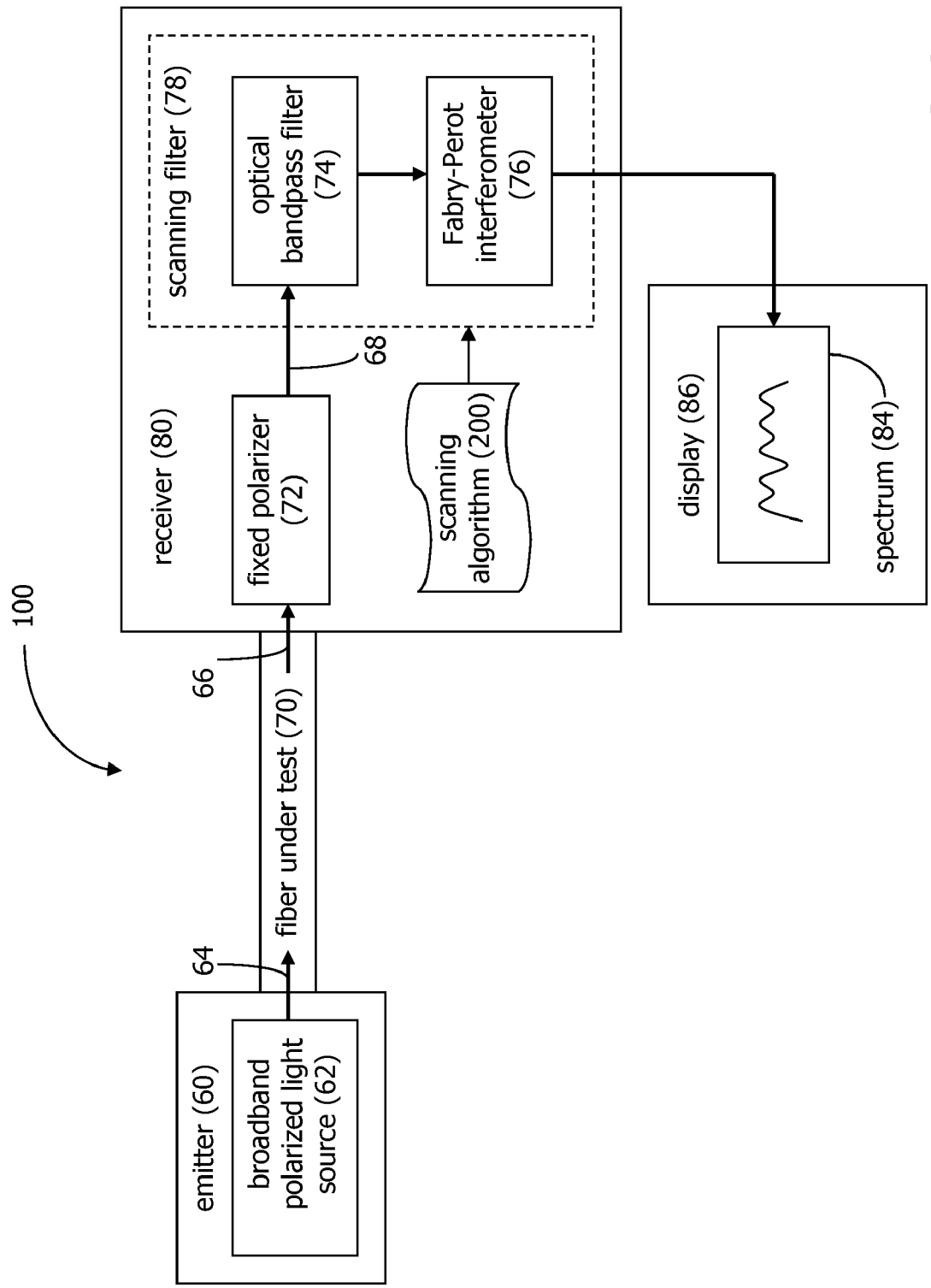
FIG. 2 is a block diagram of a PMD measurement device 100, according to some embodiments.

FIG. 2 is a block diagram of a PMD measurement device 100, according to some embodiments. The PMD measurement device 100 includes an emitter 60 located at one end of an optical fiber, or fiber under test (FUT) 70, and a receiver 80 at the other end. The emitter 60 includes a broadband polarized light source 62, to generate an optical input signal 64. In one embodiment, the light source 62 is a broadband light-emitting diode (LED). The receiver 80 includes a fixed polarizer 72 and a scanning filter 78. The scanning filter 78 includes an optical bandpass filter 74, and a Fabry-Perot interferometer 76. A spectrum 84 of a polarized optical output signal 68 generated by the scanning filter 78 is viewable on a display 86.

As in the prior art fixed analyzer method (FIG. 1A), the transmitted light 66 enters a fixed polarizer 72 in the receiver 80. The fixed polarizer 72 selects one polarization state of the light 66 that is transmitted through the fiber 70, resulting in the linear polarized output signal 68. The polarized light 68 is sent into an optical bandpass filter 74, which, by filtering out undesired wavelengths of the signal 68, allows the signal to be received into the Fabry-Perot interferometer 76.

The Fabry-Perot interferometer 76 is the wavelength selective element of the receiver 80. The Fabry-Perot interferometer 76 performs spectral filtering of the transmitted light 66. The Fabry-Perot interferometer 76 includes two movable reflectors with a thin spacer in between. The transmission function of this interferometer is given by the wavelength dependent phase of the light after multiple reflections at the mirrors. Constructive interference occurs for wavelengths which are reflected in-phase. These in-phase wavelengths are transmitted through the interferometer. Other wavelengths are reflected. The Fabry-Perot interferometer 76 is thus a type of passband filter.

Accordingly, the Fabry-Perot interferometer 76 may be tuned to let pass a desired wavelength, filtering out other wavelengths. In contrast to diffraction gratings, thin-film filters, and other types of tunable filters, which are operated mechanically, the Fabry-Perot interferometer 76 has no moving parts. Instead, the Fabry-Perot interferometer 76 uses piezoelectric technology to move the reflecting surfaces, such that a desired wavelength passes through the surfaces. The interferometer 76 may thus scan an incoming optical signal at a high rate without the use of moving parts. Further, the Fabry-Perot interferometer may be produced with a very small spectral linewidth, allowing higher PMD values to be measured. The Fabry-Perot interferometer 76 thus improves the quality of the scanning filter 78 in the PMD measurement device 100 over prior art technologies.

Fabry-Perot interferometers have some drawbacks. For one, the interferometers are difficult to calibrate. In other words, it is difficult to initialize the parameters by comparison to which wavelengths may be selected. Fabry-Perot interferometers also have a non-Gaussian line shape. Finally, the limited free spectral range of the Fabry-Perot interferometer results in several transmitted interference orders and thus an uncertainty of the wavelength range in which the device is used.

While the line shape is not a problem for PMD measurements, the other drawbacks are addressed by adding an optical bandpass filter 74. First, the bandpass filter 74 enables a calibration of the spectrum with a sufficient precision for accurate PMD measurements. This is done by using the known wavelengths of the filter edges as reference points for the spectral calibration. Second, the optical bandpass filter 74 is used to eliminate the unwanted interference orders of the Fabry-Perot interferometer 76. Thus, for example, where the Fabry-Perot interferometer has a free spectral range of 100 nanometers (nm) and is tuned to a wavelength of 1300 nm, the filter will let pass light with a wavelength of the desired 1300 nm, but also will let pass light with a wavelength of 1400 nm, 1500 nm, and so on. The optical bandpass filter 74 may be centered on 1300 nm wavelength, ensuring that only the 1300 nm wavelength passes through the scanning filter 78. In FIG. 2, the optical bandpass filter 74 is shown receiving the polarized light 68 before the light signal is received by the Fabry-Perot interferometer 76. However, the two devices 74 and 76 may be reversed in position, producing the same results.

Figure 3:
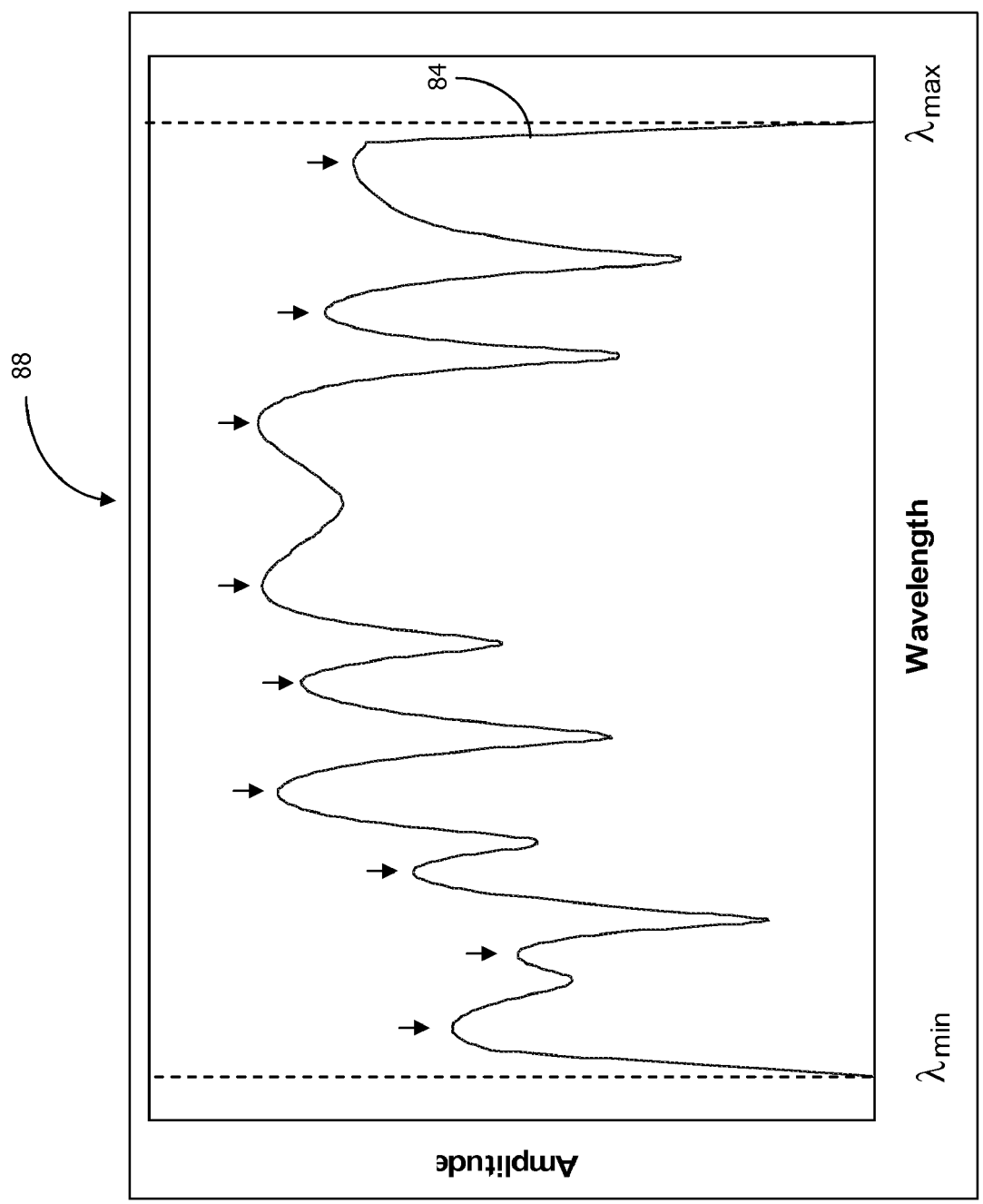
FIG. 3 is a graph of a typical spectrum wherein the extrema are counted within the wavelength range given by the bandpass filter to obtain a PMD measurement, according to some embodiments.
Figure 4:
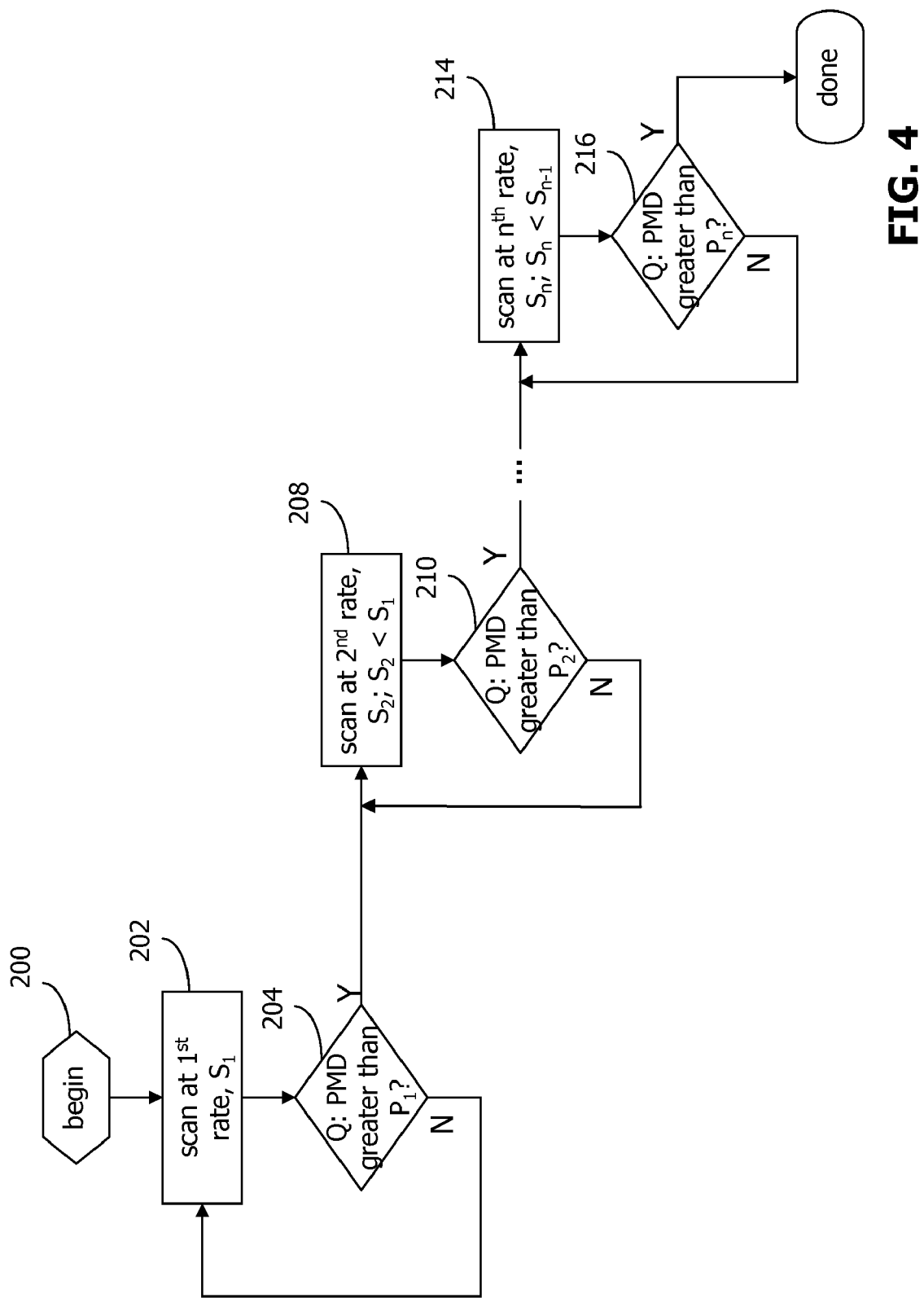
FIG. 4 is a flow diagram of the algorithm used by the PMD measurement device of FIG. 2, according to some embodiments.

Since the PMD of the FUT 70 is proportional to the number of extrema in the spectrum 84, the PMD measurement is obtained by counting the extrema. In FIG. 3, the spectrum 84 is depicted as a graph 88, a plot of wavelength, $\lambda$, versus amplitude. The extrema are indicated with arrows. In the graph of FIG. 3, there are twelve extrema within the spectral band, $\lambda_{min}$ to $\lambda_{max}$, given by the bandpass filter.

Returning to FIG. 2, the receiver 80 of the PMD measurement device 100 further includes a scanning algorithm 200, operating as a control mechanism over the scanning filter 78. In essence, the scanning algorithm 200 performs multiple scans, each subsequent scan being based on the results of a prior scan, in a sort of feedback loop, to obtain accurate PMD and complete data about the FUT 70.

When the scanning filter 78 performs scanning at a high rate, valid PMD results may be obtained, even when the FUT 70 is moving, such as with aerial displacement during high winds. The Fabry-Perot interferometer 76 is well-suited to high-speed scanning, because it uses no moving parts that may otherwise limit the scan rate. The Fabry-Perot interferometer 76 is further capable of operating at slower scan rates, which need to be applied to obtain a valid result in case of high PMD values and high losses in the FUT 70. In some embodiments, the scanning algorithm 200 selects the optimal scanning speed to achieve optimum immunity against moving fibers, even when the scan rate is low.

The scanning algorithm 200 that controls the scanning filter 78 is designed to optimally obtained PMD measurements for optical fibers under a variety of operating conditions. A flow diagram in illustrates the operation of the scanning algorithm 200, according to some embodiments.

The scanning algorithm 200 begins by scanning the polarized light signal 68 at a first scanning rate, $S_1$ (block 202). In some embodiments, the scanning rate $S_1$ is a fast scanning rate, typically faster than 50 ms to go from $\lambda_{min}$ to $\lambda_{max}$. Once a quantity of PMD is obtained, this amount is compared to a predetermined amount, P1 (block 204). If the PMD of the fiber is greater than P1 (the "yes" prong of block 204), the scanning filter 78 is run again at a second scan rate $S_2$, with the second scanning rate $S_2$ being less than the first scanning rate, i.e., $S_2<S_1$ (block 208). If, instead, the PMD is not greater than the predetermined amount, $P_1$ (the "no" prong of block 204), the measured PMD is the final result and the operation of the scanning algorithm 200 is complete.

Once a scan at the second rate, $S_2$, is performed (block 208), another PMD quantity is obtained. This quantity is compared to a second predetermined amount, $P_2$ (block 210). If the PMD amount does not exceed P2 (the "no" prong of block 210), the second measured PMD value is the final result and the operation of the scanning algorithm 200 is complete.

The process is essentially repeated for each scan rate, with each subsequent scan rate being lower than a previous one, e.g., $S_1>S_2>S_3>\ldots>S_n$. The scanning algorithm 200 may be repeated, for averaging the results or performing long-term PMD measurements.

In some embodiments, the scanning algorithm 200 uses additional input parameters. Or, for example, the scanning rate may be varied as the optical input power changes. These additional measures may address insufficient electrical bandwidth of the receiver at low input levels.

By performing multiple scans at different scanning rates, the scanning algorithm 200 provides an optimal setting of the scanning rate for different PMD values of the fiber under test. That way, an optimal immunity against fiber movement is achieved, in some embodiments.

Figure 5A:
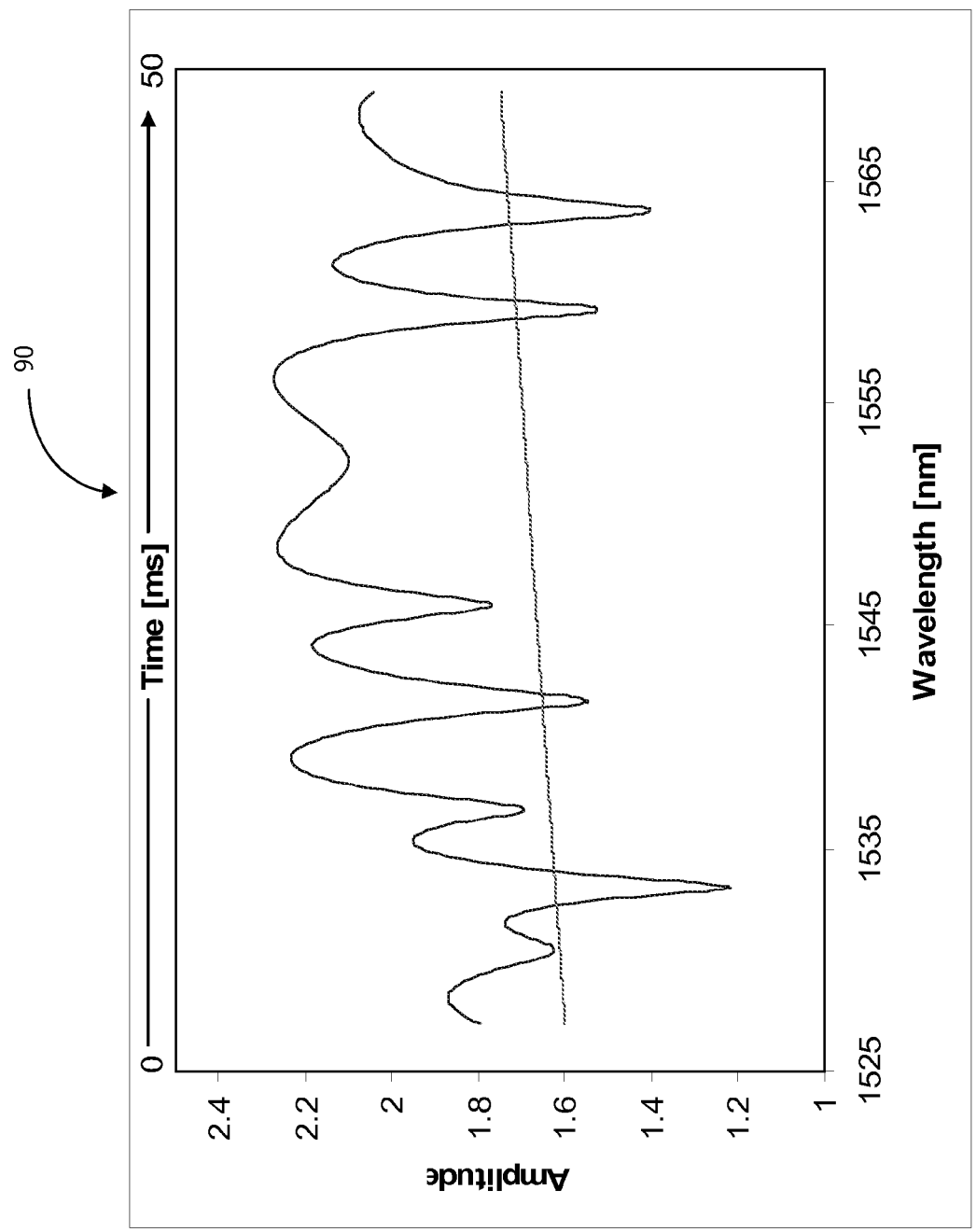
FIGS. 5A and 5B are diagrams illustrating how the scanning algorithm varies the scanning rate for different PMD values and obtains immunity against moving fibers, according to some embodiments.
Figure 5B:
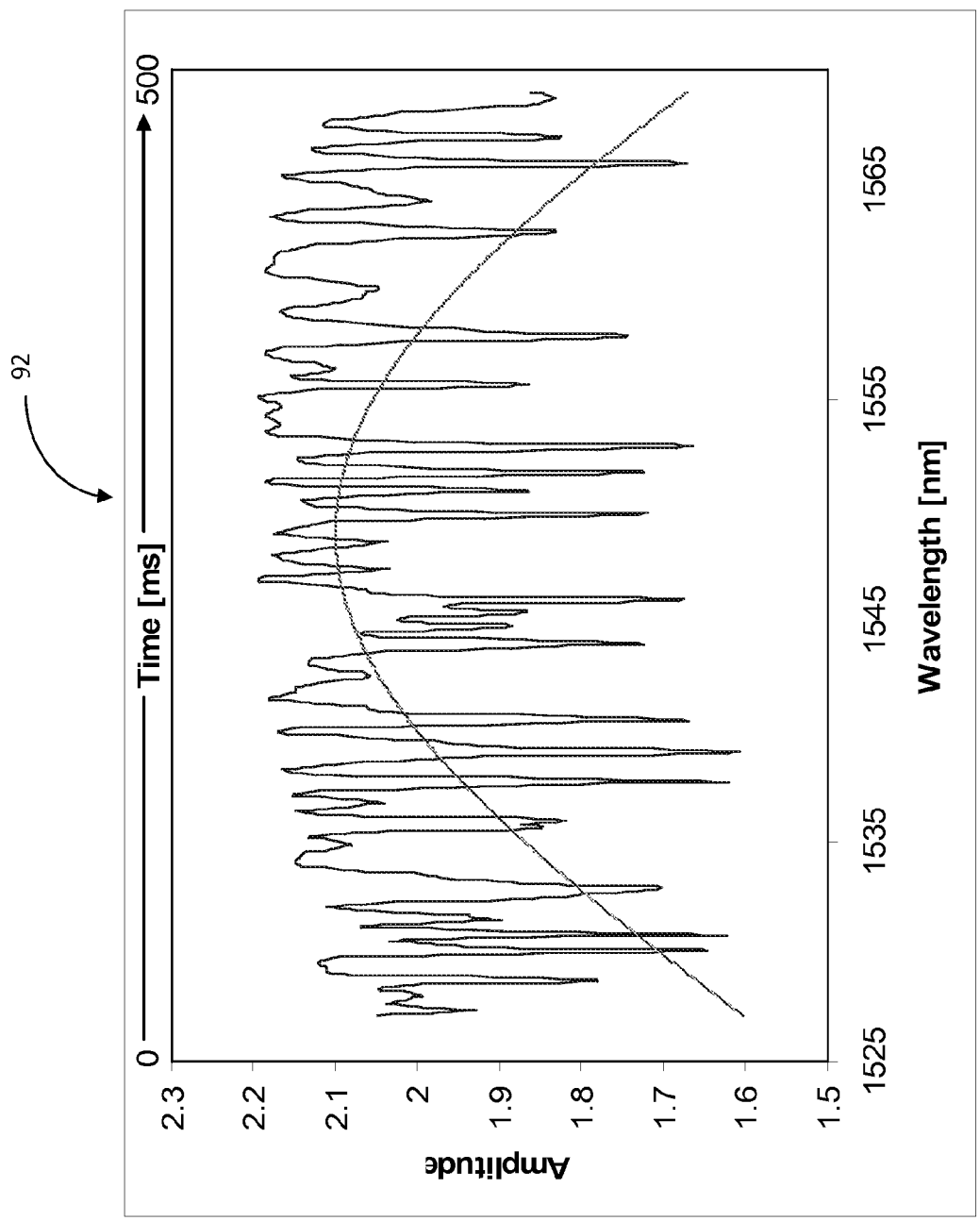

FIGS. 5A and 5B provide illustrations of this principle. The algorithm 200 performs a first scan at a predefined "highest" scan rate to produce a first spectrum, given by Graph 90. Due to bandwidth limitation, the system is limited to measure up a maximum PMD value, $P_1$, at this rate. If the measured value exceeds a threshold set to a somewhat lower value than $P_1$, a second scan is performed at a lower scan rate, allowing a measurement of a maximum PMD value, $P_2$. This process may be repeated until a predefined "slowest" scan is performed, allowing a measurement of a maximum possible PMD value, PN.

As shown in the graph 92 of FIG. 5B, higher PMD values are related to spectrograms with a higher extrema count. A fiber with a PMD value of 1 picosecond (ps) may produce a spectrogram with only five maxima, while a second PMD value of 10 ps results in fifty maxima. Therefore, even when scanning ten times slower in the second case, the error introduced by a change of the polarization state due to a moving fiber is the same in both cases. For sufficient scanning speeds, this error is negligible. This error is illustrated by a sinusoidal modulation of the polarization state at 1 Hz in FIGS. 5A and 5B.

The scanning filter 78 of the PMD measurement device 100 is thus capable of performing fast scans and slower scans. This flexibility enables the device 100 to be used for a variety of optical fibers. Instead of being designed specifically for testing mechanically stable optical fibers, very lossy fibers, or fibers with little PMD, the PMD measurement device 100 may be used for fibers of varying characteristics and in different testing environments. Further, the scanning filter 78 of the PMD measurement device 100 is able to scan over a wide wavelength range and yet have a narrow linewidth, to handle a wide range of PMD values. The scanning algorithm 200 enhances the capability of the PMD measurement device 100 by optimally performing multiple scans, where appropriate, to obtain the most accurate PMD data.

Figure 6:
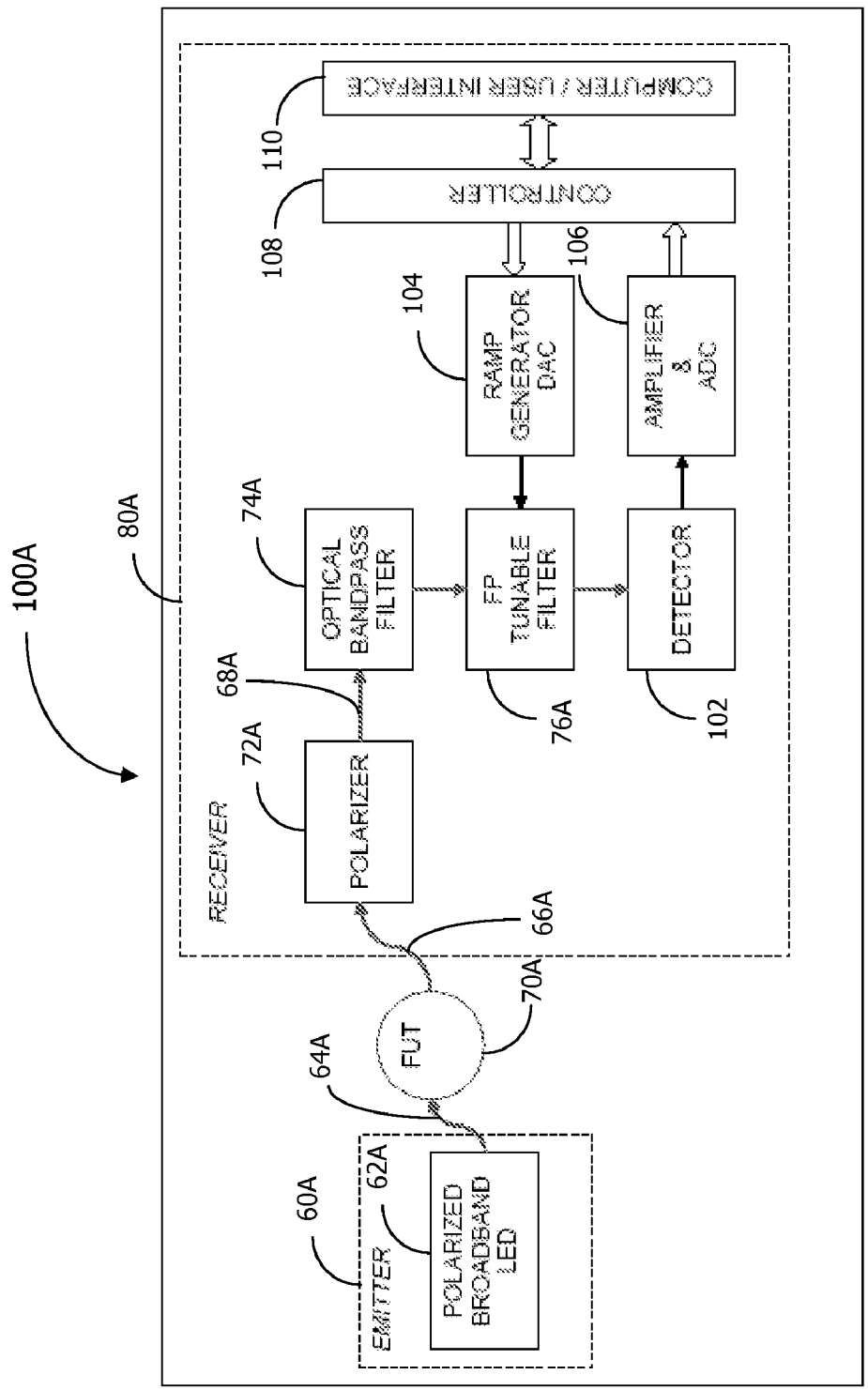
FIG. 6 is a detailed block diagram of a PMD measurement device, according to some embodiments.

FIG. 6 is a detailed block diagram of a PMD measurement device 100A, according to some embodiments. The device 100A includes an emitter 60A at one end of a FUT 70A and a receiver 80A at the other end. The emitter 60A includes a polarized broadband LED 62A as its source of light, which launches the optical input signal 64A into the FUT 70A.

At the receiver 80A, transmitted light 66A is received into a polarizer 72A, which selects one polarization state of the light 66A, resulting in a linear polarized light state 68A. The polarized light 68A is sent into an optical bandpass filter 74A, which, by filtering out undesired wavelengths, allows the signal 68A with a desired wavelength characteristic to be received into the Fabry-Perot interferometer 76A. This filter also serves as the reference for calibration of the recorded spectra.

In addition to having the components described in FIG. 2, the PMD detection device 100A includes a detector 102, a ramp generator digital-to-analog converter (DAC) 104, which generates the electrical signal for scanning the tunable filter 76A at different rates, an amplifier and analog-to-digital converter (ADC) 106, a controller 108, and a computer/user interface 110. The spectrum of the signal 68A being analyzed may be presented to a display that is part of the computer/user interface 110.

Multiple variations and modifications are possible in the embodiments of the invention described here. Although certain illustrative embodiments of the invention have been shown and described here, a wide range of modifications, changes, and substitutions is contemplated in the foregoing disclosure. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. A device adapted to measure polarization mode dispersion of an optical fiber, the device comprising:
    an emitter to transmit light through the optical fiber; and
    a receiver to analyze the transmitted light, the receiver comprising:
        a scanning Fabry-Perot interferometer to perform spectral analysis of the transmitted light; and a scanning algorithm to control the Fabry-Perot interferometer, wherein the scanning algorithm iteratively scans the Fabry-Perot interferometer at different rates, such that the polarization mode dispersion is accurately measured, even when the optical fiber is moving.

2. The device of claim 1, wherein the algorithm further:
scans the Fabry-Perot interferometer at a first scan rate to obtain a first dispersion measurement;
scans the Fabry-Perot interferometer at a second rate if the first dispersion measurement is higher than a predetermined amount.

3. The device of claim 1, further comprising: an optical bandpass filter coupled to the Fabry-Perot interferometer, the optical bandpass filter to filter out undesired interference orders of the Fabry-Perot interferometer, wherein the optical bandpass filter is a calibration reference for the spectral analysis.

4. The device of claim 1, the receiver further comprising:
a polarizer to polarize the light into a linear polarization state, wherein the receiver analyzes the polarized light.

5. A receiver to analyze light originating from a broadband polarized light source and transmitted via an optical fiber, the receiver comprising:
a scanning filter, comprising:
a scanning Fabry-Perot interferometer to perform spectral analysis of the transmitted light; and
a scanning algorithm to control the Fabry-Perot interferometer, wherein the scanning algorithm:
iteratively scans the Fabry-Perot interferometer at different rates, such that the polarization mode dispersion is accurately measured, even when the optical fiber is moving.

6. The receiver of claim 5, wherein the scanning algorithm further:
scans the Fabry-Perot interferometer at a first scan rate to obtain a first dispersion measurement;
scans the Fabry-Perot interferometer at a second rate if the first dispersion measurement is higher than a predetermined amount.

7. The receiver of claim 5, further comprising:
an optical bandpass filter coupled to the Fabry-Perot interferometer, the optical bandpass filter to filter out undesired interference orders of the Fabry-Perot interferometer, wherein the optical bandpass filter serves as a calibration reference for the spectral analysis.

8. The receiver of claim 5, further comprising:
a polarizer to polarize the light into a linear polarization state, wherein the receiver analyzes the polarized light.

9. The receiver of claim 5, wherein the broadband polarized light source is a light-emitting diode.

* * * * *